(12) United States Patent
Saito et al.

(10) Patent No.: US 9,196,921 B2
(45) Date of Patent: Nov. 24, 2015

(54) METHOD OF PRODUCING LITHIUM ION SECONDARY BATTERY, AND LITHIUM ION SECONDARY BATTERY

(71) Applicants: Taira Saito, Miyoshi (JP); Shinji Suzuki, Kariya (JP)

(72) Inventors: Taira Saito, Miyoshi (JP); Shinji Suzuki, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 266 days.

(21) Appl. No.: 14/013,629

(22) Filed: Aug. 29, 2013

(65) Prior Publication Data

US 2014/0072862 A1 Mar. 13, 2014

(30) Foreign Application Priority Data

Sep. 7, 2012 (JP) ................. 2012-197027

(51) Int. Cl.
*H01M 10/056* (2010.01)
*H01M 10/0525* (2010.01)
*H01M 4/131* (2010.01)
*H01M 10/058* (2010.01)
*H01M 10/0568* (2010.01)
*H01M 10/0569* (2010.01)

(52) U.S. Cl.
CPC .......... *H01M 10/0525* (2013.01); *H01M 4/131* (2013.01); *H01M 10/056* (2013.01); *H01M 10/058* (2013.01); *H01M 10/0568* (2013.01); *H01M 10/0569* (2013.01); *Y02E 60/122* (2013.01); *Y02T 10/7011* (2013.01); *Y10T 29/49108* (2015.01)

(58) Field of Classification Search
CPC .................................................. H01M 10/056
USPC ......................... 429/323, 338, 342
See application file for complete search history.

(56) References Cited

U.S. PATENT DOCUMENTS

2010/0119956 A1* 5/2010 Tokuda et al. ............... 429/338
2011/0111288 A1 5/2011 Nishida et al.

FOREIGN PATENT DOCUMENTS

CN 101652894 A 2/2010
CN 102036912 A 4/2011
(Continued)

OTHER PUBLICATIONS

Aug. 1, 2014 partial English translation of Office Action Issued in Japanese Application No. 2012-197027.

*Primary Examiner* — Jonathan G Leong
(74) *Attorney, Agent, or Firm* — Oliff PLC

(57) ABSTRACT

A method of producing a lithium ion secondary battery includes: selecting a positive electrode active material that has a prescribed specific surface area, and preparing a nonaqueous electrolyte solution that contains a compound with a following formula (1) at a prescribed concentration. In an xy-coordinate plane that gives a relationship between a specific surface area x [m²/g] of the positive electrode active material and a concentration y [mol/kg] of the compound in the nonaqueous electrolyte solution, a combination of the prescribed specific surface area and the prescribed concentration corresponds to a combination of values that lies within a hexagonal inner region formed by connecting 6 points (x, y)=(0.80, 0.035), (2.20, 0.05), (2.60, 0.10), (2.60, 0.16), (0.80, 0.16), and (0.50, 0.10) in this sequence with straight lines.

2 Claims, 3 Drawing Sheets (1)

(56) References Cited

FOREIGN PATENT DOCUMENTS

| JP | 11-67270 A | 3/1999 |
| JP | A-2004-31079 | 1/2004 |
| JP | 2007-194208 A | 8/2007 |
| JP | A-2013-98099 | 5/2013 |
| WO | WO 2014/024571 A1 | 2/2014 |

\* cited by examiner

METHOD OF PRODUCING LITHIUM ION SECONDARY BATTERY, AND LITHIUM ION SECONDARY BATTERY

INCORPORATION BY REFERENCE

The disclosure of Japanese Patent Application No. 2012-197027 filed on Sep. 7, 2012 including the specification, drawings and abstract is incorporated herein by reference in its entirety.

BACKGROUND OF THE INVENTION

1. Field of the Invention

The invention relates to a method of producing a lithium ion secondary battery and to a lithium ion secondary battery.

2. Description of Related Art

Lithium ion secondary batteries are receiving attention as power sources for mobile and portable devices and as power sources for, for example, electric automobiles and hybrid automobiles. Lithium ion secondary batteries are available in which a battery case houses a nonaqueous electrolyte solution and an electrode assembly having a positive electrode that contains a positive electrode active material (refer, for example, to Japanese Patent Application Publication No. 2004-31079 (JP 2004-31079 A)).

JP 2004-31079 A discloses a lithium ion secondary battery that is produced using a nonaqueous electrolyte solution that contains the compound with formula (1) below (lithium difluorophosphate; this compound is also referred to below as $LiPO_2F_7$).

(1)

After a lithium ion secondary battery that contains an $LiPO_2F_2$-added nonaqueous electrolyte solution has been assembled, a film deriving from the $LiPO_2F_2$ can be formed on the surface of the positive electrode active material by activating the battery (for example, performing the initial charge). The formation on the surface of the positive electrode active material of a film deriving from the $LiPO_2F_2$ can inhibit the formation of a film deriving from the electrolyte or solvent in the nonaqueous electrolyte solution. The film deriving from the $LiPO_2F_2$ has a lower resistance and is more stable than films deriving from the electrolyte or solvent in the nonaqueous electrolyte solution. An increase in the battery output can thus be achieved. In addition, the $LiPO_2F_2$-derived film formed on the surface of the positive electrode active material can inhibit degradation reactions (exothermic reactions) by the solvent in the nonaqueous electrolyte solution at the positive electrode and as a consequence can suppress heat generation by the battery (particularly heat generation during overcharging).

Thus, the goal of the addition of $LiPO_2F_2$ is to form an $LiPO_2F_2$-derived film on the surface of the positive electrode active material and thereby to raise the battery output and restrain the amount of heat generated during charging. In addition, the specifications for lithium ion secondary batteries are quite diverse, and the amount of nonaqueous electrolyte solution that is incorporated and the specific surface area of the positive electrode active material thus also vary among lithium ion secondary batteries. Given that the $LiPO_2F_2$-derived film is formed on the surface of the positive electrode active material, it can be contemplated that the amount of $LiPO_2F_2$ addition would preferably be determined in conformity with the specific surface area of the positive electrode active material.

On the other hand, in JP 2004-31079 A the amount of $LiPO_2F_2$ addition is defined by the weight % concentration or molar concentration in the nonaqueous electrolyte solution without considering the specific surface area of the positive electrode active material. However, when the amount of $LiPO_2F_2$ addition is defined in this manner, the amount of $LiPO_2F_2$ can then be too small or in excess in relation to the specific surface area of the positive electrode active material, and as a consequence there was concern that a battery that exhibits a high output and an inhibition of heat generation could not be obtained.

SUMMARY OF THE INVENTION

The invention provides a high-output, heat generation-inhibited lithium ion secondary battery and a method of producing a lithium ion secondary battery.

A first aspect of the invention is a method of producing a lithium ion secondary battery. The method includes: selecting a positive electrode active material that has a prescribed specific surface area; preparing a nonaqueous electrolyte solution that contains a compound with a following formula (1) at a prescribed concentration; fabricating a battery in which the nonaqueous electrolyte solution and an electrode assembly are housed in a battery case, the electrode assembly having a positive electrode that contains the positive electrode active material; and activating the battery. In an xy-coordinate plane that gives a relationship between a specific surface area x $[m^2/g]$ of the positive electrode active material and a concentration y [mol/kg] of the compound in the nonaqueous electrolyte solution, a combination of the prescribed specific surface area and the prescribed concentration corresponds to a combination of values that lies within a hexagonal inner region formed by connecting 6 points (x, y)=(0.80, 0.035), (2.20, 0.05), (2.60, 0.10), (2.60, 0.16), (0.80, 0.16), and (0.50, 0.10) in this sequence with straight lines.

(1)

As described above, the (x, y) is the combination of the specific surface area x $[m^2/g]$ of the positive electrode active material and the concentration y [mol/kg] of the compound with formula (1) below (lithium difluorophosphate; this compound is also referred to below as $LiPO_2F_2$) in the nonaqueous electrolyte solution. In this production method, the combination of the prescribed specific surface area and the prescribed concentration corresponds to a combination of values that lies within the hexagonal inner region formed by connecting the 6 points (x, y)=(0.80, 0.035), (2.20, 0.05), (2.60, 0.10), (2.60, 0.16), (0.80, 0.16), and (0.50, 0.10) in this sequence with straight lines in a coordinate system (i.e., an xy-coordinate plane) that shows the relationship between the specific surface area x and the concentration y. That is, the battery is fabricated by selecting the positive electrode active material used in the positive electrode and incorporating the $LiPO_2F_2$ in the nonaqueous electrolyte solution so the (x, y)

described above has a combination of values within the hexagonal inner region on the indicated xy-coordinate plane.

By having the specific surface area x [$m^2$/g] of the positive electrode active material and the concentration y [mol/kg] of the $LiPO_2F_2$ in the nonaqueous electrolyte solution satisfy the condition given above, a high-output, heat generation-inhibited lithium ion secondary battery can be produced by fabricating a battery in an assembly step and then activating this battery in an activation step.

In the first aspect of the invention, a solvent in the nonaqueous electrolyte solution may contain 20 to 40 volume % ethylene carbonate and at least one of dimethyl carbonate and ethyl methyl carbonate.

A high-output, heat generation-inhibited lithium ion secondary battery can be produced by using, as its nonaqueous electrolyte solution, a nonaqueous electrolyte solution that contains the solvents indicated above.

In the first aspect of the invention, the positive electrode active material may be a lithium transition metal complex oxide having the general formula $LiNi_lMn_mCo_nO_2$, where $l+m+n$ is equal to 1, $l$ is greater than 0, $m$ is greater than 0, and $n$ is greater than 0.

A high-output, heat generation-inhibited lithium ion secondary battery can be produced by using a lithium transition metal complex oxide having the general formula $LiNi_lMn_mCo_nO_2$ ($l+m+n=1$, $l>0$, $m>0$, $n>0$).

A second aspect of the invention is a lithium ion secondary battery. The lithium ion secondary battery includes an electrode assembly, a nonaqueous electrolyte solution and a battery case. The electrode assembly has a positive electrode that contains a positive electrode active material that has a prescribed specific surface area. The nonaqueous electrolyte solution contains a compound with a following formula (1) at a prescribed concentration. In an xy-coordinate plane that gives a relationship between a specific surface area x [$m^2$/g] of the positive electrode active material and a concentration y [mol/kg] of the compound in the nonaqueous electrolyte solution, a combination of the prescribed specific surface area and the prescribed concentration corresponds to a combination of values that lies within the hexagonal inner region formed by connecting 6 points (x, y)=(0.80, 0.035), (2.20, 0.05), (2.60, 0.10), (2.60, 0.16), (0.80, 0.16), and (0.50, 0.10) in this sequence with straight lines.

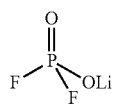

(1)

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
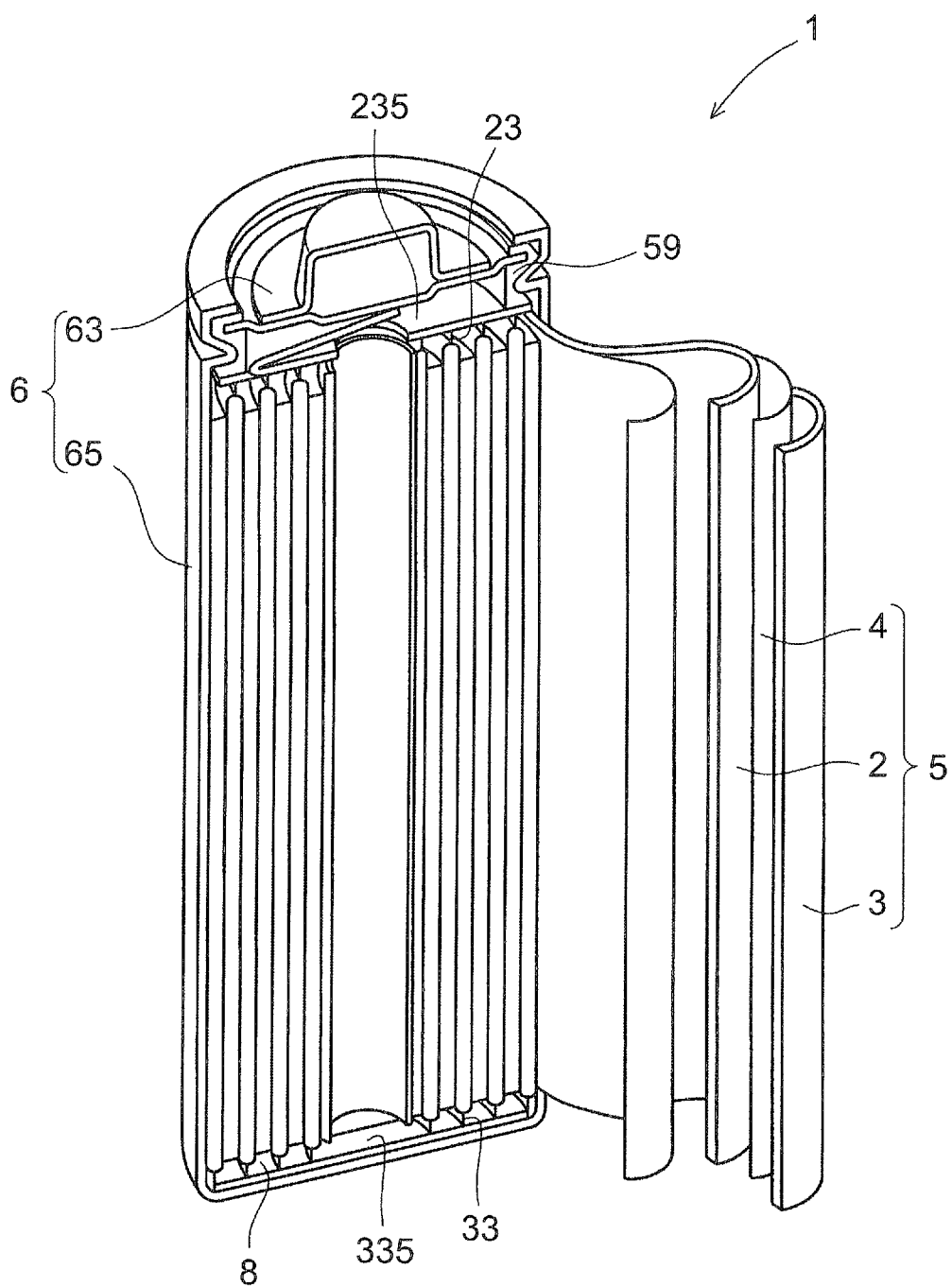
FIG. 1 is a diagram that shows the structure of a lithium ion secondary battery.

A lithium ion secondary battery 1 produced according to the production method of this embodiment will be described first. As shown in FIG. 1, the lithium ion secondary battery 1 is provided with an electrode assembly 5 and a nonaqueous electrolyte solution 8 and a battery case 6 that houses them. The battery case 6 is a cylindrical battery case and has a cap 63 and an external can 65. A gasket 59 is disposed on the inner side of the cap 63 of the battery case 6.

Figure 2:
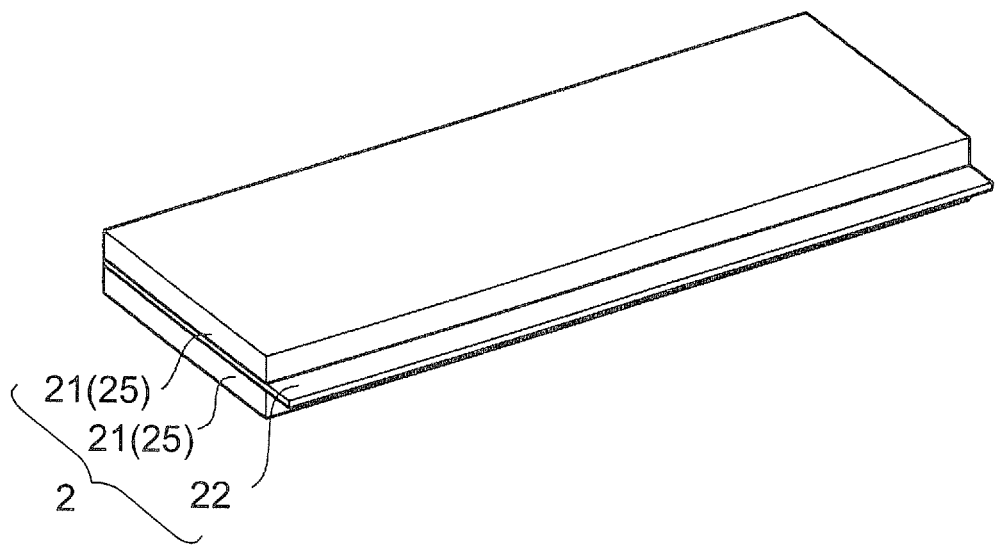
FIG. 2 is a diagram that shows the structure of the positive electrode of the same lithium ion secondary battery.

The electrode assembly 5 is a wound body provided by winding a sheet-form positive electrode 2, a sheet-form negative electrode 3, and a sheet-form separator 4 into a cylindrical shape. Thereamong, the positive electrode 2, as shown in FIG. 2, has a positive electrode current collector member 22 constituted by an aluminum foil and a positive electrode mixture layer 21 disposed on both sides thereof. The positive electrode mixture layer 21 contains a positive electrode active material 25, an electroconductive material constituted by an acetylene black, and a polyvinylidene fluoride (PVdF) as a binder. In this embodiment, a lithium transition metal complex oxide with the general formula $LiNi_lMn_mCo_nO_2$ ($l+m+n=1$, $l>0$, $m>0$, $n>0$) is used as the positive electrode active material 25 (specifically $LiNi_{1/3}Mn_{1/3}Co_{1/3}O_2$).

Figure 3:
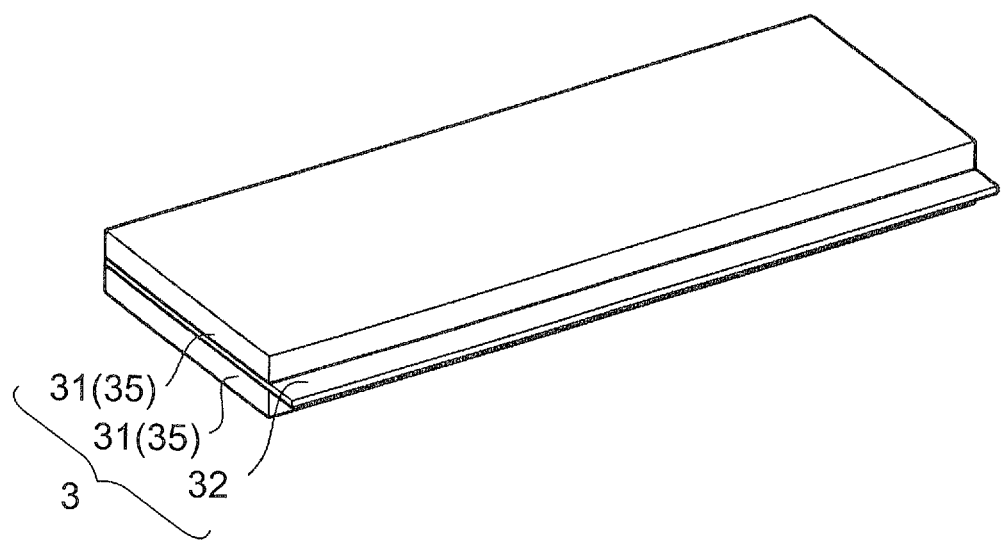
FIG. 3 is a diagram that shows the structure of the negative electrode of the same lithium ion secondary battery.

The negative electrode 3 has, as shown in FIG. 3, a negative electrode current collector member 32 constituted by a copper foil and a negative electrode mixture layer 31 disposed on both sides thereof. The negative electrode mixture layer 31 is constituted by a negative electrode active material 35, a styrene-butadiene rubber (SBR), and a carboxymethyl cellulose (CMC) in a weight ratio of 98:1:1. A graphite is used as the negative electrode active material 35 in this embodiment.

The separator 4 is a separator constituted by three layers, i.e., polypropylene (PP)/polyethylene (PE)/PP. This separator 4 is interposed between the positive electrode 2 and the negative electrode 3 and creates a separation therebetween. The nonaqueous electrolyte solution 8 is impregnated in the separator 4.

The nonaqueous electrolyte solution 8 is a nonaqueous electrolyte solution provided by the addition, to a solvent of ethylene carbonate (EC), ethyl methyl carbonate (EMC), and dimethyl carbonate (DMC) mixed in a volume ratio of 30:40:30, of $LiPF_6$ as an electrolyte and also the compound with formula (1) below ($LiPO_2F_2$). An $LiPF_6$ concentration in the nonaqueous electrolyte solution 8 of 1.1 mol/kg is used. Preferably the solvent in the nonaqueous electrolyte solution 8 contains 20 to 40 volume % EC and contains as the remainder at least one of DMC and EMC.

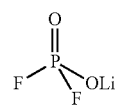

(1)

Figure 5:
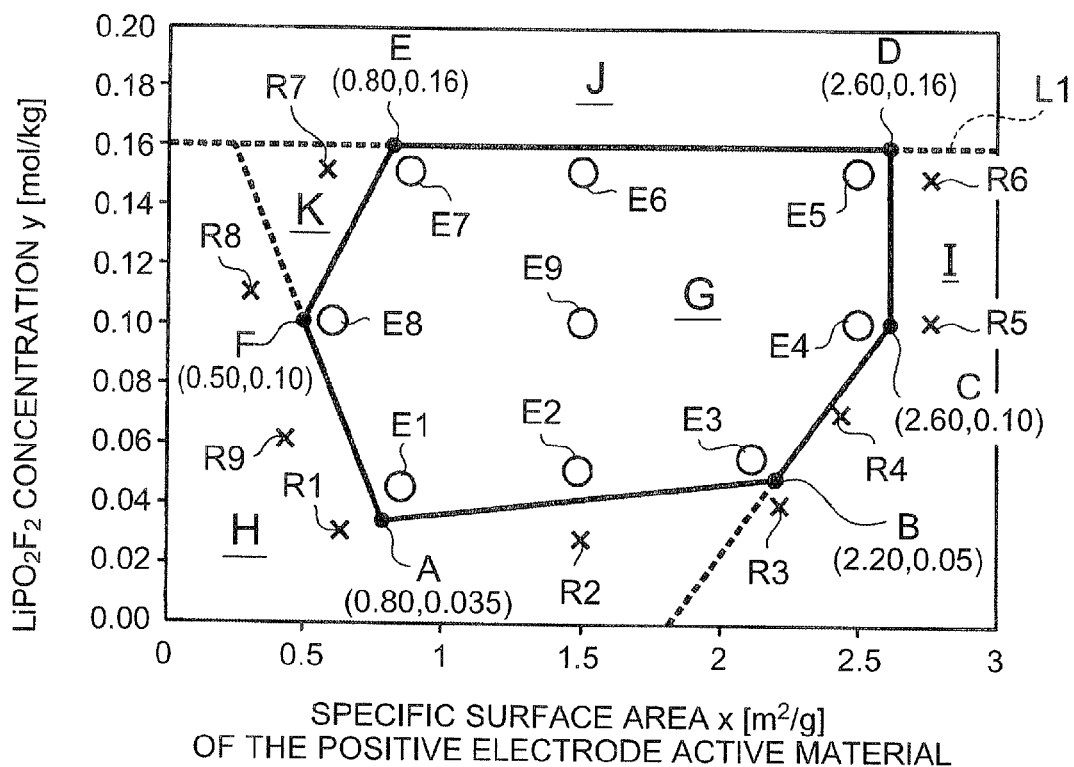
FIG. 5 is a diagram that shows the appropriate range for the (x, y) combination of the specific surface area x of the positive electrode active material and the $LiPO_2F_2$ concentration y.

In this embodiment, the combination when the lithium ion secondary battery 1 is produced of the specific surface area x [$m^2$/g] of the positive electrode active material 25 and the $LiPO_2F_2$ concentration y [mol/kg] in the nonaqueous electrolyte solution 8 is defined as (x, y). In addition, an hexagonal inner region G—which is formed by connecting the 6 points (x, y)=(0.80, 0.035), (2.20, 0.05), (2.60, 0.10), (2.60, 0.16), (0.80, 0.16), and (0.50, 0.10) in this sequence with straight lines in a coordinate system that shows the relationship between the specific surface area x and the concentration y (i.e., an xy-coordinate plane)—is defined in this embodiment as shown in FIG. 5. In the production of the lithium ion secondary battery 1, the battery 1 is fabricated in this embodiment so that (x, y) corresponds to a combination of values within the inner region G. Thus, the battery 1 is fabricated by selecting the positive electrode active material 25 used in the positive electrode 2 and incorporating $LiPO_2F_2$ in the nonaqueous electrolyte solution 8 such that this (x, y) is a combination of values within the hexagonal inner region G in the xy-coordinate plane shown in FIG. 5.

In FIG. 5, point A represents (x, y)=(0.80, 0.035); point B represents (x, y)=(2.20, 0.05); point C represents (x, y)=(2.60, 0.10); point D represents (x, y)=(2.60, 0.16); point E represents (x, y)=(0.80, 0.16); and point F represents (x, y)=(0.50, 0.10). In this embodiment, the specific surface area x of the positive electrode active material 25 and the $LiPO_2F_2$ concentration y in the nonaqueous electrolyte solution 8 are selected to provide values within the hexagonal inner region G formed by connecting these points A, B, C, D, E, and F sequentially using straight lines.

In addition, the saturation concentration for $LiPO_2F_2$ in the nonaqueous electrolyte solution 8 is 0.16 mol/kg. Accordingly, the $LiPO_2F_2$ concentration y cannot be made larger than 0.16 mol/kg. In FIG. 5, the line for the saturation concentration of 0.16 mol/kg is indicated by the dashed line L1, while the region of concentration y values larger than this is indicated by a J. This region J is a region in which battery fabrication is not possible.

As described above, the battery 1 is fabricated by having the specific surface area x $[m^2/g]$ of the positive electrode active material 25 and the $LiPO_2F_2$ concentration y [mol/kg] in the nonaqueous electrolyte solution 8 satisfy the condition indicated above. As a result of the satisfaction of the condition indicated above, the battery 1 becomes a lithium ion secondary battery that exhibits a high output and an inhibition of heat generation (particularly heat generation during overcharging).

In this embodiment, the value of the BET specific surface area provided by nitrogen gas adsorption is used for the value of the specific surface area of the positive electrode active material 25. That is, the specific surface area of the positive electrode active material is calculated by the BET method based on the value measured for the amount of nitrogen gas adsorption. Specifically, the specific surface area of the positive electrode active material 25 is determined using the following conditions. Measurement under the same conditions is also used in the comparative examples that are given below.

An "Autosorb 1" from Quantachrome Instruments was used as the measurement instrument for measuring the specific surface area. Nitrogen gas was used as the adsorbate. 0.5 g of a powder of the positive electrode active material 25 was used as the measurement sample after drying for 3 hours at 100° C. The BET multipoint method at 8 points in the relative pressure range from 0.025 to 0.200 was used as the method for analyzing the specific surface area.

In addition, as shown in FIG. 1, a positive electrode current collector lead 23 is welded to the positive electrode 2 and a negative electrode current collector lead 33 is welded to the negative electrode 3. The positive electrode current collector lead 23 is welded to a positive electrode current collector tab 235 that is disposed on the cap 63 end. The negative electrode current collector lead 33 is welded to a negative electrode current collector tab 335 disposed at the bottom of the external can 65.

Figure 4:
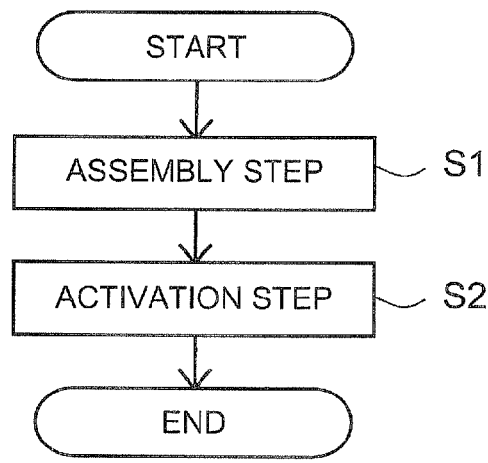
FIG. 4 is a flowchart that shows the sequence in the method of producing a lithium ion secondary battery.

The method of producing the lithium ion secondary battery according to this embodiment is described in the following. First, as shown in FIG. 4, a battery having an electrode assembly 5 and a nonaqueous electrolyte solution 8 housed within a battery case 6 is fabricated in step S1 (assembly step).

Specifically, a positive electrode 2 was first produced as follows. $LiNi_{1/3}Mn_{1/3}Co_{1/3}O_2$ is used as the positive electrode active material 25. This positive electrode active material 25, an electroconductive material constituted by acetylene black, and a binder constituted by PVdF were then mixed and a suitable amount of N-methyl-2-pyrrolidone (NMP) was added as a dispersant to obtain a positive electrode mixture paste.

The specific surface area x $[m^2/g]$ of the positive electrode active material 25 corresponds to a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F in FIG. 5) in this sequence with straight lines in the xy-coordinate plane shown in FIG. 5. For example, an $LiNi_{1/3}Mn_{1/3}Co_{1/3}O_2$ having a specific surface area x=0.85 $[m^2/g]$ is used as the positive electrode active material 25.

The positive electrode mixture paste prepared as described above was then coated on both sides of a positive electrode current collector member 22 constituted by 20 μm-thick aluminum foil and was dried. Thereafter, the positive electrode current collector member 22, which the positive electrode mixture paste was coated on, was subjected to compression forming with a roll press. This provided a sheet-form positive electrode 2 in which a positive electrode mixture layer 21 was layered on both sides of the positive electrode current collector member 22 (refer to FIG. 2).

The negative electrode 3 was fabricated as follows. First, graphite was used as the negative electrode active material 35. A negative electrode mixture paste was then prepared by mixing this negative electrode active material 35, SBR, and CMC in water.

This negative electrode mixture paste was then coated on both sides of a negative electrode current collector member 32 constituted by 10 μm-thick copper foil and was dried. Thereafter, the negative electrode current collector member 32, which the negative electrode mixture paste was coated on, was subjected to compression forming with a roll press. This provided a sheet-form negative electrode 3 in which a negative electrode mixture layer 31 was layered on both sides of the negative electrode current collector member 32 (refer to FIG. 3).

The positive electrode current collector lead 23 was then welded to the positive electrode 2 and the negative electrode current collector lead 33 was welded to the negative electrode 3 (refer to FIG. 1). Winding was subsequently carried out with a PE separator 4 interposed between the positive electrode 2 and the negative electrode 3 to produce a cylindrical electrode assembly 5.

The nonaqueous electrolyte solution 8 was prepared as follows. The nonaqueous electrolyte solution 8 was prepared by adding $LiPF_6$ and $LiPO_2F_2$ to a solvent provided by mixing EC, DMC, and EMC in a 30:40:30 volumetric ratio.

The $LiPF_6$ concentration in the nonaqueous electrolyte solution 8 was set to 1.1 mol/kg. In addition, the $LiPO_2F_2$ concentration y [mol/kg] in the nonaqueous electrolyte solution 8 was set, considering the specific surface area x of the positive electrode active material 25, to a value within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F in FIG. 5) in this sequence with straight lines in the xy-coordinate plane shown in FIG. 5. When an $LiNi_{1/3}Mn_{1/3}Co_{1/3}O_2$ having a specific surface area x=0.85 $[m^2/g]$ is used as the positive electrode active material 25, an $LiPO_2F_2$ concentration y in the nonaqueous electrolyte solution 8 is set to, for example, 0.045 [mol/kg].

The thusly fabricated electrode assembly 5 was then inserted into the external can 65. At this point, the positive electrode current collector lead 23 was welded to the positive electrode current collector tab 235 and the negative electrode current collector lead 33 was welded to the negative electrode current collector tab 335 disposed at the bottom of the external can 65. This was followed by injection of the nonaqueous electrolyte solution 8 into the battery case 6. The gasket 59 was positioned on the inner side of the cap 63 and this cap 63 was placed on the opening in the external can 65. The external can 65 was sealed by the cap 63 by swaging the cap 63. At this point, the battery case 6 is constituted by the cap 63 and the external can 65 and assembly of the lithium ion secondary battery is complete.

Then, proceeding to step S2 (activation step) as shown in FIG. 4, an activation treatment was performed on the lithium ion secondary battery assembled as described above. Specifically, an initial charging was first carried out on the lithium ion secondary battery. For example, charging is carried out at a constant current of 1 C to a battery voltage value of 4.1 V followed by charging while maintaining the battery voltage value at 4.1 V and finishing charging at the point at which the charging current value drops to 0.1 A. By doing this the lithium ion secondary battery is brought to a 100% state of charge (SOC).

Here, 1 C is the current value at which discharge is complete in 1 hour when a battery having a rated capacity value (nominal capacity value) for the capacity is discharged at constant current. In this embodiment, 1 C=3.8 A because the rated capacity (nominal capacity) of the lithium ion secondary battery is 3.8 Ah.

Then, once the initial charging had been completed, ageing was performed by holding the lithium ion secondary battery at a prescribed temperature (for example, 60° C.) for a prescribed time (for example, 20 hours). A lithium ion secondary battery 1 was obtained by activating the lithium ion secondary battery in the manner described. This activation results in the formation of a $LiPO_2F_2$-derived film on the surface of the positive electrode active material 25.

As has been described in the preceding, in the production method of this embodiment, the battery is fabricated (assembled) such that the (x, y) combination of the specific surface area x $[m^2/g]$ of the positive electrode active material 25 and the $LiPO_2F_2$ concentration y [mol/kg] in the nonaqueous electrolyte solution 8 corresponds to a combination of values within the hexagonal inner region G in a coordinate system (i.e., an xy-coordinate plane) that shows the relationship between the specific surface area x and the concentration y, as shown in FIG. 5. Thereafter, this battery is activated. The hexagonal inner region G is formed by connecting the 6 points (x, y)=(0.80, 0.035), (2.20, 0.05), (2.60, 0.10), (2.60, 0.16), (0.80, 0.16), and (0.50, 0.10) (points A, B, C, D, E, and F) in this sequence with straight lines.

That is, the battery 1 is fabricated (assembled) by selecting the positive electrode active material 25 used in the positive electrode 2 and incorporating the $LiPO_2F_2$ in the nonaqueous electrolyte solution 8 so that the (x, y) described above assumes a value within the hexagonal inner region G on the xy-coordinate plane shown in FIG. 5, and this battery is subsequently activated.

The production method of this embodiment can thus produce a lithium ion secondary battery that exhibits a high output (in particular an excellent low-temperature output) and an inhibition of heat generation (particularly heat generation during overcharging). These effects are made clear by the results of the low-temperature output test and overcharging test described below.

In Example 1, a $LiNi_{1/3}Mn_{1/3}Co_{1/3}O_2$ having a specific surface area x of 0.85 $[m^2/g]$ was used as the positive electrode active material 25. A nonaqueous electrolyte solution in which the $LiPO_2F_2$ concentration y was 0.045 [mol/kg] was used for the nonaqueous electrolyte solution 8. Thus, (x, y)=(0.85, 0.045) was used. This (x, y)=(0.85, 0.045) is given in FIG. 5 by the circle designated "E1". As shown in FIG. 5, (x, y)=(0.85, 0.045) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 2, a $LiNi_{1/3}Mn_{1/3}Co_{1/3}O_2$ having a specific surface area x of 1.50 $[m^2/g]$ was used as the positive electrode active material 25. A nonaqueous electrolyte solution in which the $LiPO_2F_2$ concentration y was 0.050 [mol/kg] was used for the nonaqueous electrolyte solution 8. Thus, (x, y)=(1.50, 0.050) was used. This (x, y)=(1.50, 0.050) is given in FIG. 5 by the circle designated "E2". As shown in FIG. 5, (x, y)=(1.50, 0.050) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 3, an $LiNi_{1/3}Mn_{1/3}Co_{1/3}O_2$ having a specific surface area x of 2.05 $[m^2/g]$ was used as the positive electrode active material 25. A nonaqueous electrolyte solution in which the $LiPO_2F_2$ concentration y was 0.055 [mol/kg] was used for the nonaqueous electrolyte solution 8. Thus, (x, y)=(2.05, 0.055) was used. This (x, y)=(2.05, 0.055) is given in FIG. 5 by the circle designated "E3". As shown in FIG. 5, (x, y)=(2.05, 0.055) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 4, an $LiNi_{1/3}Mn_{1/3}Co_{1/3}O_2$ having a specific surface area x of 2.50 $[m^2/g]$ was used as the positive electrode active material 25. A nonaqueous electrolyte solution in which the $LiPO_2F_2$ concentration y was 0.100 [mol/kg] was used for the nonaqueous electrolyte solution 8. Thus, (x, y)=(2.50, 0.100) was used. This (x, y)=(2.50, 0.100) is given in FIG. 5 by the circle designated "E4". As shown in FIG. 5, (x, y)=(2.50, 0.100) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 5, an $LiNi_{1/3}Mn_{1/3}Co_{1/3}O_2$ having a specific surface area x of 2.50 $[m^2/g]$ was used as the positive electrode active material 25. A nonaqueous electrolyte solution in which the $LiPO_2F_2$ concentration y was 0.150 [mol/kg] was used for the nonaqueous electrolyte solution 8. Thus, (x, y)=(2.50, 0.150) was used. This (x, y)=(2.50, 0.150) is given in FIG. 5 by the circle designated "E5". As shown in FIG. 5, (x, y)=(2.50, 0.150) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 6, an $LiNi_{1/3}Mn_{1/3}Co_{1/3}O_2$ having a specific surface area x of 1.50 $[m^2/g]$ was used as the positive electrode active material 25. A nonaqueous electrolyte solution in which the $LiPO_2F_2$ concentration y was 0.150 [mol/kg] was used for the nonaqueous electrolyte solution 8. Thus, (x, y)=(1.50, 0.150) was used. This (x, y)=(1.50, 0.150) is given in FIG. 5 by the circle designated "E6". As shown in FIG. 5, (x, y)=(1.50, 0.150) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 7, an $LiNi_{1/3}Mn_{1/3}Co_{1/3}O_2$ having a specific surface area x of 0.85 [m$^2$/g] was used as the positive electrode active material 25. A nonaqueous electrolyte solution in which the $LiPO_2F_2$ concentration y was 0.150 [mol/kg] was used for the nonaqueous electrolyte solution 8. Thus, (x, y)=(0.85, 0.150) was used. This (x, y)=(0.85, 0.150) is given in FIG. 5 by the circle designated "E7". As shown in FIG. 5, (x, y)=(0.85, 0.150) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 8, an $LiNi_{1/3}Mn_{1/3}Co_{1/3}O_2$ having a specific surface area x of 0.60 [m$^2$/g] was used as the positive electrode active material 25. A nonaqueous electrolyte solution in which the $LiPO_2F_2$ concentration y was 0.100 [mol/kg] was used for the nonaqueous electrolyte solution 8. Thus, (x, y)=(0.60, 0.100) was used. This (x, y)=(0.60, 0.100) is given in FIG. 5 by the circle designated "E8". As shown in FIG. 5, (x, y)=(0.60, 0.100) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Example 9, an $LiNi_{1/3}Mn_{1/3}Co_{1/3}O_2$ having a specific surface area x of 1.50 [m$^2$/g] was used as the positive electrode active material 25. A nonaqueous electrolyte solution in which the $LiPO_2F_2$ concentration y was 0.100 [mol/kg] was used for the nonaqueous electrolyte solution 8. Thus, (x, y)=(1.50, 0.100) was used. This (x, y)=(1.50, 0.100) is given in FIG. 5 by the circle designated "E9". As shown in FIG. 5, (x, y)=(1.50, 0.100) is a combination of values within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 1, an $LiNi_{1/3}Mn_{1/3}Co_{1/3}O_2$ having a specific surface area x of 0.65 [m$^2$/g] was used as the positive electrode active material. A nonaqueous electrolyte solution was used in which the $LiPO_2F_2$ concentration y was 0.030 [mol/kg]. Thus, (x, y)=(0.65, 0.030) was used. This (x, y)=(0.65, 0.030) is given in FIG. 5 by the cross designated "R1". As shown in FIG. 5, (x, y)=(0.65, 0.030) is a combination of values in the hexagonal outer region (specifically in region H) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines. This hexagonal outer region in the xy-plane is divided in FIG. 5 into 4 regions designated regions H, I, J, and K, and the boundaries of these regions are indicated by dashed lines.

In Comparative Example 2, an $LiNi_{1/3}Mn_{1/3}Co_{1/3}O_2$ having a specific surface area x of 1.50 [m$^2$/g] was used as the positive electrode active material. A nonaqueous electrolyte solution was used in which the $LiPO_2F_2$ concentration y was 0.030 [mol/kg]. Thus, (x, y)=(1.50, 0.030) was used. This (x, y)=(1.50, 0.030) is given in FIG. 5 by the cross designated "R2". As shown in FIG. 5, (x, y)=(1.50, 0.030) is a combination of values in the hexagonal outer region (specifically in region H) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 3, an $LiNi_{1/3}Mn_{1/3}Co_{1/3}O_2$ having a specific surface area x of 2.20 [m$^2$/g] was used as the positive electrode active material. A nonaqueous electrolyte solution was used in which the $LiPO_2F_2$ concentration y was 0.040 [mol/kg]. Thus, (x, y)=(2.20, 0.040) was used. This (x, y)=(2.20, 0.040) is given in FIG. 5 by the cross designated "R3". As shown in FIG. 5, (x, y)=(2.20, 0.040) is a combination of values in the hexagonal outer region (specifically in region I) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 4, an $LiNi_{1/3}Mn_{1/3}Co_{1/3}O_2$ having a specific surface area x of 2.45 [m$^2$/g] was used as the positive electrode active material. A nonaqueous electrolyte solution was used in which the $LiPO_2F_2$ concentration y was 0.070 [mol/kg]. Thus, (x, y)=(2.45, 0.070) was used. This (x, y)=(2.45, 0.070) is given in FIG. 5 by the cross designated "R4". As shown in FIG. 5, (x, y)=(2.45, 0.070) is a combination of values in the hexagonal outer region (specifically in region I) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 5, an $LiNi_{1/3}Mn_{1/3}Co_{1/3}O_2$ having a specific surface area x of 2.70 [m$^2$/g] was used as the positive electrode active material. A nonaqueous electrolyte solution was used in which the $LiPO_2F_2$ concentration y was 0.100 [mol/kg]. Thus, (x, y)=(2.70, 0.100) was used. This (x, y)=(2.70, 0.100) is given in FIG. 5 by the cross designated "R5". As shown in FIG. 5, (x, y)=(2.70, 0.100) is a combination of values in the hexagonal outer region (specifically in region I) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 6, an $LiNi_{1/3}Mn_{1/3}Co_{1/3}O_2$ having a specific surface area x of 2.70 [m$^2$/g] was used as the positive electrode active material. A nonaqueous electrolyte solution was used in which the $LiPO_2F_2$ concentration y was 0.150 [mol/kg]. Thus, (x, y)=(2.70, 0.150) was used. This (x, y)=(2.70, 0.150) is given in FIG. 5 by the cross designated "R6". As shown in FIG. 5, (x, y)=(2.70, 0.150) is a combination of values in the hexagonal outer region (specifically in region I) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 7, an $LiNi_{1/3}Mn_{1/3}Co_{1/3}O_2$ having a specific surface area x of 0.60 [m$^2$/g] was used as the positive electrode active material. A nonaqueous electrolyte solution was used in which the $LiPO_2F_2$ concentration y was 0.150 [mol/kg]. Thus, (x, y)=(0.60, 0.150) was used. This (x, y)=(0.60, 0.150) is given in FIG. 5 by the cross designated "R7". As shown in FIG. 5, (x, y)=(0.60, 0.150) is a combination of values in the hexagonal outer region (specifically in region K) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 8, an $LiNi_{1/3}Mn_{1/3}Co_{1/3}O_2$ having a specific surface area x of 0.35 [m$^2$/g] was used as the positive electrode active material. A nonaqueous electrolyte solution was used in which the $LiPO_2F_2$ concentration y was 0.110 [mol/kg]. Thus, (x, y)=(0.35, 0.110) was used. This (x, y)=(0.35, 0.110) is given in FIG. 5 by the cross designated "R8". As shown in FIG. 5, (x, y)=(0.35, 0.110) is a combination of values in the hexagonal outer region (specifically in region H) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

In Comparative Example 9, an $LiNi_{1/3}Mn_{1/3}Co_{1/3}O_2$ having a specific surface area x of 0.45 [m$^2$/g] was used as the positive electrode active material. A nonaqueous electrolyte solution was used in which the $LiPO_2F_2$ concentration y was 0.060 [mol/kg]. Thus, (x, y)=(0.45, 0.060) was used. This (x, y)=(0.45, 0.060) is given in FIG. 5 by the cross designated "R9". As shown in FIG. 5, (x, y)=(0.45, 0.060) is a combination of values in the hexagonal outer region (specifically in region H) formed by connecting the 6 points (x, y)=(0.80, 0.035), (2.20, 0.05), (2.60, 0.10), (2.60, 0.16), (0.80, 0.16), and (0.50, 0.10) (points A to F) in this sequence with straight lines.

Low-temperature output testing was conducted on the batteries from Examples 1 to 9 and Comparative Examples 1 to 9. Specifically, each battery was adjusted to a 27% SOC and was subjected to a constant-power discharge at a certain prescribed output value (W) in a low-temperature atmosphere at −30° C. and the time (number of seconds for discharge) required to reach a 0% SOC was measured from the start of the discharge. In addition, this same constant-power discharge was run using various different values for the output value and the time (number of seconds for discharge) required to reach a 0% SOC was measured from the start of the discharge.

Based on the results of these measurement, the correlation between the number of seconds for discharge and the output value was obtained for each battery. Then, the output value at which the number of seconds for discharge was 2 seconds was determined, for each battery, as the low-temperature output value (W) from this correlation. That is, the low-temperature output value (W) is the output value for a constant-power discharge from a 27% SOC to a 0% SOC in 2 seconds in an atmosphere with a temperature of −30° C. The results are given in Table 1. In this test, a battery in which the output value was greater than or equal to 110 W was rated as a high-output battery.

TABLE 1

| | specific surface area x [m$^2$/g] | $LiPO_2F_2$ concentration y [mol/kg] | output [W] | maximum attained temperature during overcharge [° C.] |
|---|---|---|---|---|
| Example 1 | 0.85 | 0.045 | 121 | 105 |
| Example 2 | 1.50 | 0.050 | 130 | 112 |
| Example 3 | 2.05 | 0.055 | 145 | 135 |
| Example 4 | 2.50 | 0.100 | 185 | 138 |
| Example 5 | 2.50 | 0.150 | 177 | 131 |
| Example 6 | 1.50 | 0.150 | 138 | 108 |
| Example 7 | 0.85 | 0.150 | 125 | 103 |
| Example 8 | 0.60 | 0.100 | 120 | 101 |
| Example 9 | 1.50 | 0.100 | 148 | 110 |
| Comparative Example 1 | 0.65 | 0.030 | 86 | 104 |
| Comparative Example 2 | 1.50 | 0.030 | 91 | 112 |
| Comparative Example 3 | 2.20 | 0.040 | 130 | 169 |
| Comparative Example 4 | 2.45 | 0.070 | 166 | 170 |
| Comparative Example 5 | 2.70 | 0.100 | 187 | 162 |
| Comparative Example 6 | 2.70 | 0.150 | 184 | 152 |
| Comparative Example 7 | 0.60 | 0.150 | 74 | 98 |
| Comparative Example 8 | 0.35 | 0.110 | 81 | 99 |
| Comparative Example 9 | 0.45 | 0.060 | 79 | 102 |

An overcharge test was also performed on each of the batteries of Examples 1 to 9 and Comparative Examples 1 to 9. Specifically, in an atmosphere with a temperature of 25° C., each battery was charged (overcharged) at a constant current of 20 A until the battery voltage value reached 25 V and the maximum attained temperature for the battery when this was done was measured. The results are reported in Table 1. In this test, a battery for which the maximum attained temperature was less than or equal to 140° C. was rated as a heat generation-inhibited battery.

The results of the low-temperature output test and the overcharge test for the batteries will now be considered. As shown in Table 1, all of the batteries in Examples 1 to 9 had an output value of at least 110 W and thus exhibited a high output (excellent low-temperature output). Moreover, all of the batteries in Examples 1 to 9 had a maximum attained temperature during overcharge of not more than 140° C. and thus were able to suppress heat generation during overcharging. It can be concluded from these results that all of the batteries in Examples 1 to 9 were lithium ion secondary batteries that provided a high output (in particular an excellent low-temperature output) and an inhibition of heat generation (particularly heat generation during overcharging).

In contrast to this, the battery of Comparative Example 1, while it had a maximum attained temperature during overcharging of not more than 140° C. and thus could provide an inhibition of heat generation during overcharging, also had an output value of less than 110 W (86 W specifically) and thus did not exhibit a high output (an excellent low-temperature output). The battery of Comparative Example 2 also had a maximum attained temperature during overcharging of not more than 140° C. and thus could provide an inhibition of heat generation during overcharging, but again did not exhibit a high output (an excellent low-temperature output) because its output value was less than 110 W (91 W specifically).

The battery of Comparative Example 7 also had a maximum attained temperature during overcharging of not more than 140° C. and thus could provide an inhibition of heat generation during overcharging, but again did not exhibit a high output (an excellent low-temperature output) because its output value was less than 110 W (74 W specifically). The battery of Comparative Example 8 also had a maximum attained temperature during overcharging of not more than 140° C. and thus could provide an inhibition of heat generation during overcharging, but again did not exhibit a high output (an excellent low-temperature output) because its output value was less than 110 W (81 W specifically). The battery of Comparative Example 9 also had a maximum attained temperature during overcharging of not more than 140° C.

and thus could provide an inhibition of heat generation during overcharging, but again did not exhibit a high output (an excellent low-temperature output) because its output value was less than 110 W (79 W specifically).

On the other hand, the battery of Comparative Example 3, while it had an output value of at least 110 W and thus exhibited a high output (excellent low-temperature output), had a maximum attained temperature in overcharging that was greater than 0.140° C. (169° C. specifically) and thus was unable to inhibit heat generation during overcharging. In addition, the battery of Comparative Example 4, while it had an output value of at least 110 W and thus exhibited a high output (excellent low-temperature output), also had a maximum attained temperature in overcharging that was greater than 140° C. (170° C. specifically) and thus was unable to inhibit heat generation during overcharging.

The battery of Comparative Example 5, while it had an output value of at least 110 W and thus exhibited a high output (excellent low-temperature output), also had a maximum attained temperature in overcharging that was greater than 140° C. (162° C. specifically) and thus was unable to inhibit heat generation during overcharging. In addition, the battery of Comparative Example 6, while it had an output value of at least 110 W and thus exhibited a high output (excellent low-temperature output), also had a maximum attained temperature in overcharging that was greater than 140° C. (152° C. specifically) and thus was unable to inhibit heat generation during overcharging.

When considered in detail, the batteries in Comparative Examples 1, 2, 8, and 9 are batteries that fall within region H, as shown in FIG. 5. Region H is a region in which either the specific surface area x [m$^2$/g] of the positive electrode active material is small or the $LiPO_2F_2$ concentration y [mol/kg] in the nonaqueous electrolyte solution is low. Among the batteries belonging to region H, it can be concluded that the batteries in Comparative Examples 8 and 9 were unable to provide a high output because the specific surface area x [m$^2$/g] of the positive electrode active material was too small (less than 0.50).

On the other hand, in Comparative Example 1, while the specific surface area x of the positive electrode active material was larger than in Example 8, it is thought that a high output could not be exhibited because the $LiPO_2F_2$ concentration y was too low. Specifically, it is thought that a suitable $LiPO_2F_2$-derived film was not formed in Comparative Example 1 over the entire surface of the positive electrode active material because the proportion (amount) of $LiPO_2F_2$ was too small relative to the surface area of the positive electrode active material. Moreover, in Comparative Example 1, a film deriving from the nonaqueous electrolyte solution was also believed to be formed on the surface of the positive electrode active material in addition to the $LiPO_2F_2$-derived film. It is thought that a high output could then not be obtained in Comparative Example 1 because this film deriving from the nonaqueous electrolyte solution has a higher resistance than the $LiPO_2F_2$-derived film.

In the case of Comparative Example 2, while the specific surface area x of the positive electrode active material is the same as in Example 2, it is thought that a high output could not be obtained because the $LiPO_2F_2$ concentration y is too low. The specific reason is the same as in Comparative Example 1, supra.

As shown in FIG. 5, the batteries in Comparative Examples 3, 4, 5, and 6 are batteries that reside in region I. Region I is a region where the positive electrode active material has a large specific surface area x [m$^2$/g] and the proportion (amount) of $LiPO_2F_2$ relative to the surface area of the positive electrode active material is low.

For the batteries in Comparative Examples 3 to 6, it is thought that the $LiPO_2F_2$-derived film was not suitably formed over the entire surface of the positive electrode active material because the proportion (amount) of $LiPO_2F_2$ was too small relative to the surface area of the positive electrode active material. Moreover, a film deriving from the nonaqueous electrolyte solution was also believed to be formed on the surface of the positive electrode active material in the batteries in Comparative Examples 3 to 6 in addition to the $LiPO_2F_2$-derived film. As a consequence, when the battery temperature is raised due to overcharging, decomposition reactions by the nonaqueous electrolyte solution (solvent) are facilitated on the film deriving from the nonaqueous electrolyte solution. It is thought that since these decomposition reactions are exothermic reactions, the temperature increase by the battery is then accelerated and the battery temperature rises above 140° C.

The specific surface area x of the positive electrode active material is 2.70 [m$^2$/g] in both Comparative Example 5 and Comparative Example 6. When 2.70 [m$^2$/g] is used for the specific surface area x, increasing the $LiPO_2F_2$ concentration y in order to inhibit heat generation by the battery ends up reaching the J region, which is above the $LiPO_2F_2$ saturation concentration. That is, the $LiPO_2F_2$ cannot be dissolved in the nonaqueous electrolyte solution in the amount required to inhibit heat generation by the battery. As a consequence, a satisfactory inhibition of heat generation by the battery cannot be obtained when the positive electrode active material has a specific surface area x of 2.70 [m$^2$/g] or more.

The battery of Comparative Example 7 is, as shown in FIG. 5, a battery that falls in the K region. The K region is a region in which the $LiPO_2F_2$ proportion (amount) is too large relative to the surface area of the positive electrode active material. The $LiPO_2F_2$-derived film has a lower resistance than the film deriving from the nonaqueous electrolyte solution. On the other hand, when the $LiPO_2F_2$ proportion (amount) is too large relative to the surface area of the positive electrode active material, the $LiPO_2F_2$-derived film then becomes too thick and a large resistance ends up occurring to the contrary. The output of the battery cannot be raised as a result. While the relative surface area x of the positive electrode active material in Comparative Example 7 is the same as in Example 8, it is thought that, since the $LiPO_2F_2$ concentration y was too high relative to the surface area x of the positive electrode active material, the $LiPO_2F_2$-derived film became too thick, a large resistance then occurred, and the battery output could not be raised as a consequence.

Based on the results described above for Examples 1 to 9 and Comparative Examples 1 to 9, it can be concluded that the combination (x, y) of the specific surface area x [m$^2$/g] of the positive electrode active material and the $LiPO_2F_2$ concentration y [mol/kg] in the nonaqueous electrolyte solution is advantageously made a combination of values that lies within the hexagonal inner region G formed by connecting the 6 points (x, y)=(0.80, 0.035), (2.20, 0.05), (2.60, 0.10), (2.60, 0.16), (0.80, 0.16), and (0.50, 0.10) (points A to F in FIG. 5) in this sequence with straight lines in the xy-coordinate plane shown in FIG. 5.

As has been described in the preceding, a battery is fabricated in the assembly step in the embodiments of the invention by having the combination (x, y) of the specific surface area x [m$^2$/g] of the positive electrode active material and the $LiPO_2F_2$ concentration y [mol/kg] in the nonaqueous electrolyte solution be a combination of values within the above-described inner region G, that is, by having (x, y) correspond to a combination of values within this inner region G. This is followed by activation of the battery in an activation step. As a result, a lithium ion secondary battery can be produced that exhibits a high output (and particularly an excellent low-temperature output) and an inhibition of heat generation (particularly the heat generation during overcharging).

The invention is described above based on embodiments, but the invention is not limited to or by these embodiments and various suitable modifications may be used within a range that does not depart from the essential features of the invention.

What is claimed is:

1. A method of producing a lithium ion secondary battery, comprising:

fabricating a battery in which an electrode assembly and a nonaqueous electrolyte solution are housed in a battery case, the electrode assembly comprising a positive electrode that contains a positive electrode active material, and the nonaqueous electrolyte solution containing a compound of Formula (1); and

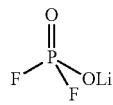

Formula (1)

activating the battery;

wherein:

in fabricating the battery, the positive electrode active material is $LiNi_{1/3}Mn_{1/3}Co_{1/3}O_2$, and the battery is fabricated such that, in an xy-coordinate plane that gives a relationship between a specific surface area x $[m^2/g]$ of the positive electrode active material and a concentration y [mol/kg] of the compound of Formula (1) in the nonaqueous electrolyte solution, a combination (x, y) of the specific surface area x and the concentration y is a combination of values that are present within a hexagonal inner region formed by connecting six points (x, y)=(0.80, 0.035), (2.20, 0.05), (2.60, 0.10), (2.60, 0.16), (0.80, 0.16), and (0.50, 0.10) in this sequence with straight lines.

2. The method of producing a lithium ion secondary battery according to claim 1 wherein the nonaqueous electrolyte solution comprises a solvent comprising ethylene carbonate in a concentration in a range of from 20 to 40 volume % and at least one of dimethyl carbonate and ethyl methyl carbonate.

* * * * *